United States Patent [19]

Wallrafen

[11] Patent Number: 4,829,247

[45] Date of Patent: May 9, 1989

[54] ANGLE SENSOR WITH INDUCTIVE COIL COUPLING

[75] Inventor: Werner Wallrafen, Kelkheim, Fed. Rep. of Germany

[73] Assignee: VDO Adolf Schindling AG, Frankfurt am Main, Fed. Rep. of Germany

[21] Appl. No.: 82,853

[22] Filed: Aug. 5, 1987

[30] Foreign Application Priority Data

Sep. 12, 1986 [DE] Fed. Rep. of Germany ....... 3631042

[51] Int. Cl.$^4$ ............................................... G01B 7/30
[52] U.S. Cl. ..................................... 324/208; 324/262
[58] Field of Search ............... 324/207, 208, 219, 226, 324/227, 228, 239, 243, 244, 245, 246, 253–255, 257, 258, 260–262; 340/870.33, 870.34, 870.35

[56] References Cited

U.S. PATENT DOCUMENTS

| | | | |
|---|---|---|---|
| 4,013,911 | 3/1977 | Fujiwara et al. | 324/208 X |
| 4,392,375 | 7/1983 | Eguchi et al. | 324/208 X |
| 4,638,250 | 1/1987 | Shen-Orr et al. | 324/208 X |
| 4,646,011 | 2/1987 | Wallrefen | 324/208 |
| 4,658,162 | 4/1987 | Koyama et al. | 324/208 X |
| 4,682,104 | 7/1987 | Lombard et al. | 324/208 |

Primary Examiner—Reinhard J. Eisenzopf
Assistant Examiner—Warren S. Edmonds
Attorney, Agent, or Firm—Martin A. Farber

[57] ABSTRACT

An angle sensor (1) with a rotatably arranged transmitter part (5) and a fixed transmitter part (9). The rotatable transmitter part (5) has a coil (10) which can be connected to a source of alternating current, is wound helically on a support and extends on both sides of an axis of rotation (53) with longitudinal axis extending transverse to it. The fixed receiver part (9) contains at least one sensor for electromagnetic fields which is arranged facing and spaced from the coil (10). The sensor extends on both sides of the axis of rotation (53) transverse to it and is connected on the output side to a circuit which has circuit components (22, 23, 24, 25, 26) for compensating for the deviations of the output signal or signals of the stationary receiver part (9) from a fixed relationship of the angular position of the rotatable transmitter part (5) and the output signal or signals of the stationary receiver part (9) which are caused by asymmetries or inaccuracies in the arrangement of the transmitter and receiver parts (5, 9).

13 Claims, 4 Drawing Sheets

ANGLE SENSOR WITH INDUCTIVE COIL COUPLING

FIELD AND BACKGROUND OF THE INVENTION

The present invention relates to an angle sensor having a rotatably arranged transmitter part and a stationary transmitter part.

Electromagnetic or inductive angle sensors (resolvers) are known which have a stator with stator windings and a rotor with at least one rotor winding. With these angle sensors it is possible to produce, with high precision, at least one signal which is a function of the instantaneous angular position of the rotor. Such inductive angle sensors are relatively complicated and expensive.

Angle sensors which are equipped with other components, for instance Hall sensors, field plates and the like, can, it is true, be manufactured at less expense but they are relatively inaccurate. Optical angle encoders require high precision of positioning, and embodiments of high precision are complicated and expensive.

It is an object of the invention to develop an electromagnetic angle sensor operating without contact which has a rotatably arranged transmitter part and a stationary transmitter part and achieves the precision of a resolver while being of simple mechanical construction.

SUMMARY OF THE INVENTION

Accordingly, the rotatable transmitter part (5) has a coil (10) which can be connected to a source of alternating current, the coil being spirally wound on a support and extending on both sides of an axis of rotation (53) with longitudinal axis extending transverse to said axis of rotation, and the stationary receiver part (9) contains at least one sensor for electromagnetic fields which is located opposite to and spaced from the coil (10) and extends on both sides of the rotational axis (53) transverse thereto. Furthermore, the sensor is connected on the output side to a circuit which has circuit components (22-26) for compensating or partially compensating for the deviations—caused by asymmetries or inaccuracies in the arrangement of the transmitter parts (5, 9)—of the output signal or signals of the stationary receiver part (9) from a fixed relationship between the angular position of the rotatable transmitter part (5) and the output signal or signals of the stationary receiver part (9), the components being components for compensating for asymmetries and/or signal amplitudes and/or coil-angle stagger. The said relationship is determined by the principle of measurement of the angle sensor.

The principle of measurement establishes the function which can be achieved with precise alignment and accurate development of the transmitter and receiver parts. The invention is based on the principle of compensating for the deviations from this function by means of a circuit. This means that certain tolerances in the mounting of the transmitter and receiver parts and the construction of the transmitter and receiver parts are permissible without this having an unfavorable effect on the precision of the apparatus. Compensating for these tolerances in the circuit is easier and simpler to carry out than the precise maintaining of very narrow tolerances in mechanical construction and in the mutual alignment of the two transmitter parts. Therefore a relatively accurate angle sensor can be produced with relatively simple transmitter parts which can be manufactured and mounted without great expense.

In one preferred embodiment, the stationary receiver part (9) has two spirally wound coils (12, 13) which have their longitudinal axes 90° from each other, and the outlets of which are connected to the circuit. By this device a sinusoidal and a cosinusoidal output signal are produced as a function of the angular position of the rotatable transmitter part. These signal forms therefore agree, with relatively simple construction, with those of the outputs of a resolver.

Preferably at least the coil (10) of the rotatable transmitter part (5) is wound on a ferromagnetic core (11) within the external field of which the stationary receiver part (9) is arranged. The ferromagnetic core is preferably a ferrite core. In this way, a higher field strength is obtained at the location of the stationary receiver part.

It is favorable to arrange the coil (10) of the rotatably arranged transmitter part (5) on a block-shaped core (11) of highly permeable material and the coils (12, 13) of the stationary receiver part (9) on a cylindrical disk core (14) of a highly permeable material. The two coils of the stationary receiver part are wound 90° apart from each other over the faces of the disk core. The one face of the disk core faces the one broad side of the block-shaped body. The apparatus described above can be manufactured in simple and inexpensive manner.

The coil (10) with the block-shaped core (11) is preferably fastened in the end of a rotatable shaft of nonmagnetic material, while the coils (12, 13) wound on the disk core (14) are arranged in a housing (7) at the bottom of a bore (6) into which the shaft (2) extends. The coils are in this way protected against external influences.

In a preferred embodiment, the rotatably arranged coil (10) is connected to the secondary winding (15) of a rotary transformer whose primary winding (16) is fastened in the housing which bears the stationary receiver part (9). The feeding of energy for the coil of the rotatable transmitter part is effected without contact. In this way, wiper contacts are avoided.

If the rotary body turns in each case alternately in one direction or the other only within a limited angular range of turning, a line feed via flexible lines can also be provided to the coil (10) of the turnable transmitter part.

The two coils (12, 13) of the stationary receiver part (9) are preferably developed for the production of one period each of a sinusoidal and cosinusoidal amplitude of the output voltage as a function of the position of rotation of the rotatable transmitter part (5) upon a full revolution. The coils of the stationary receiver part can consist of a series of windings which are wound closely alongside of each other in order to keep the cross-sectional dimensions as small and compact as possible. The alternating field of the rotatable coil produces sine or cosine inductions in the two coils of the stationary transmitter parts.

It is also possible to develop the two coils (12, 13) of the stationary receiver part (9) for the production of one period of a triangular-shaped voltage per revolution of the rotatable transmitter part (5), the two voltages being shifted in phase by a quarter period with respect to each other.

One particularly favorable embodiment consists therein that each of the output voltages of the two coils (12, 13) of the stationary receiver part (9) is connected, via a phase-selective rectifier (18, 19) controlled by the source of alternating current, to an amplifier (20, 21) which has the circuit components (22, 23; 24, 25) by which compensation variables can be changed. With this arrangement, two dc voltages are produced the values of which correspond to the sine and cosine respectively of the angular position of the rotatable transmitter part. Mechanical tolerances of the centering positions of the coils in the two transmitter and receiver parts and the influence of the rotary transformer on the output signals of the stationary coils can be compensated for in each case by an adjustable superimposed voltage. Differences in the amplitudes of the sinusoidal and co-sinusoidal voltages are compensated for by different amplifications of the two signals.

One suitable embodiment is that an oscillator feeds the primary winding (16) of the rotary transformer to which primary winding (16) there is connected a phase-related scanning signal generation (30) controlled by the oscillator (28) and to which there is connected one control electrode each of an FET switch (41, 42) which is connected, in series with a coil (12, 13) of the stationary receiver part (9) and resistors (43, 44; 45, 46, 51, 52), to the inputs of an operational amplifier (47, 48), the variable gain and the superimposable voltage part of which serves for the adjustment of the compensation values. Correction measures can be carried out for this arrangement for the different error effects, the mechanical tolerances of the centering of the transmitter and receiver coils, the influence of the rotary transformer and the other asymmetries, so that each of the output voltages of the operational amplifier has a precise sinusoidal or cosinusoidal course as a function of the angular position of the rotatable transmitter part or else with each angular position there is associated a given value of a dc voltage which changes sinusoidally or cosinusoidally according to the angular position.

Moreover, the circuit for compensating for the deviations, caused by asymmetries or inaccuracies in the arrangement of the transmitter and receiver parts (5, 9), in the output signal or signals of the stationary transmitter part (9) is arranged at or near the transmitter parts (5, 9) in the same housing (7).

Also at least the transmitter parts (5, 9) and the circuit are surrounded by shielding against electromagnetic fields.

In order to compensate for the angular shift between the two coils (12, 13) of the stationary receiver part (9), a voltage of one output voltage which is proportional to the tangent of the angle of shift is superimposed, with correct sign, on the other output voltage.

Before the adjustment of the compensation values, the output voltages of the coils of the stationary receiver part are measured during a full revolution of the rotatable transmitter part and the angle of shift determined with reference to the intended function. The compensation values of the circuit components are then so adjusted that no phase difference is present any longer between the sinusoidal and cosinusoidal output signals.

Another suitable way of determining the compensation values is to measure the output voltages of the coils in predeterminable angular positions. The compensation values of the circuit components are then so adjusted based on these measurement values that no phase difference is present any longer between the sinusoidal and cosinusoidal output voltages.

BRIEF DESCRIPTION OF THE DRAWING

With the above and other objects and advantages in view, the present invention with become more clearly understood in connection with the detailed description of preferred embodiments, when considered with the accompanying drawings, of which.

DETAILED DESCRIPTION OF THE PREFERRED EMBODIMENTS

Figure 1:
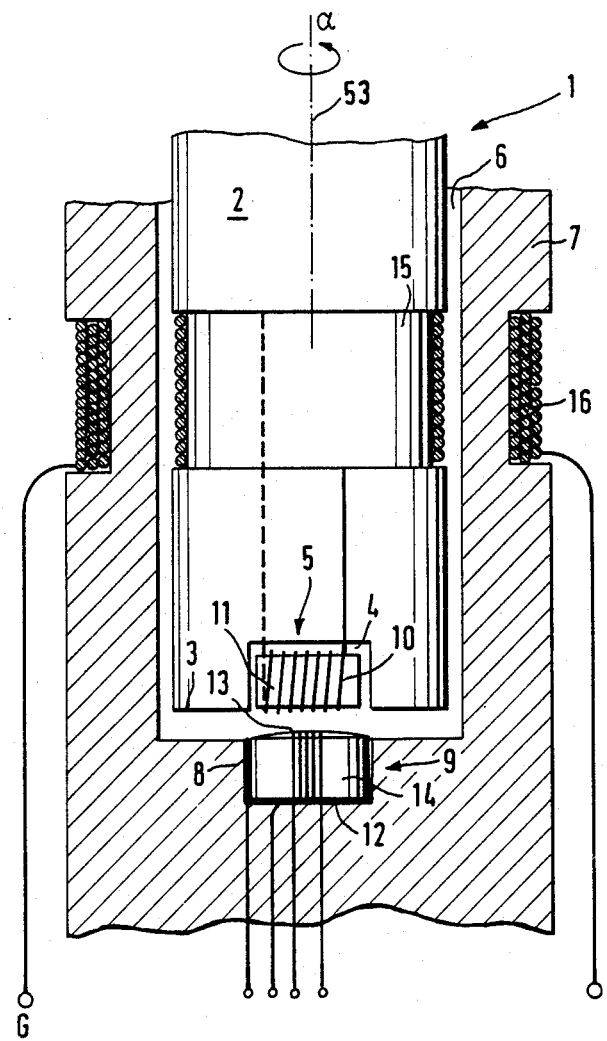
FIG. 1 shows an angle sensor diagrammatically in longitudinal section.

An electromagnetic angle sensor 1 contains a rotatably mounted shaft 2 the one end 3 of which has a recess 4 within which a turnably arranged transmitter part 5 is arranged. The shaft 2 extends into the bore 6 of a housing. On the bottom of the bore 6 there is provided in the housing 7 another recess 8 in which a stationary receiver part 9 is arranged.

The rotatable transmitter part 5 has a coil 10 which is helically wound on a block-shaped core 11 of a highly permeable material, preferably ferrite. The broad side of the block faces the stationary receiver part 9, which contains two coils 12, 13 which are helically wound on a cylindrical disk core 14 of highly permeable material, for instance ferrite. The two coils 12, 13 are 90° apart. They are wound over the faces of the disc core. The one circular face of the disk core 14 faces the rotatable transmitter part. The coils 10, 12 and 13 extend on both sides of an axis of rotation 53 of the angle sensor 1 with their longitudinal axes being transverse to the axis of rotation 53.

The two ends of the coil 10 are connected to the secondary winding 15 of a rotary transformer, the primary winding 16 of which is arranged in a recess in the housing 7.

Via the rotary transformer, the coil 10 is fed with an alternating voltage which induces in the coils 12 and 13 voltages the values of which depend on the winding position of the rotatable transmitter part 5 with respect to the coils 12, 13. With precise alignment of the coils 10 and 12, 13 to each other and with the same development of the two coils 12 and 13, and with a voltage of constant amplitude on the coil 10, a sinusoidal and cosinusoidal voltage appear in the most favorable case, at the coils 12 and 13 as a function of the angular position $\alpha$ of the shaft.

Figure 2:
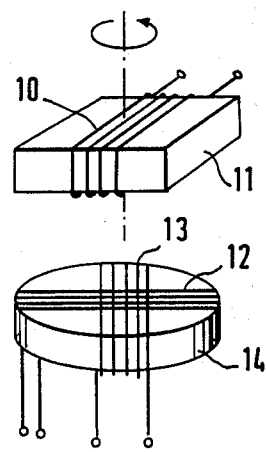
FIG. 2 is a perspective view of a turnable transmitter part and of a stationary receiver part of the angle sensor shown in FIG. 1.

The electromagnetic angle sensor 1 therefore converts the angular position of an axis rotation designated by $\alpha$ in FIGS. 1 and 2 into an electrical signal. The coil 10 is supplied as transmitting coil with an alternating current of constant amplitude and produces an electromagnetic field. The direction of the lines of force is changed by the rotation of the shaft 2. A part of the lines of force of this field penetrate into the stationary coils 12, 13 as receiver coils and induce in each winding a signal of alternating voltage which is dependent on the angle.

If, for instance, the two windings 12 and 13 are 90° apart then the sigal voltages are also shifted in phase by the angle $\alpha$ by 90°. The course of the function (curve shape) of the signal voltage to each individual winding is determined by the course of the lines of force and thus by the geometry and permeability of the transmitter coil and the receiver coils. Suitable shapes and curves are, for instance, sine or triangle functions.

Figure 3A:
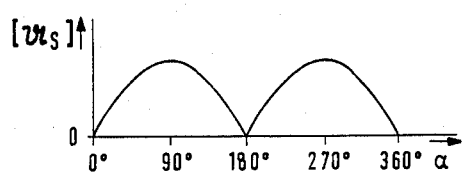
FIGS. 3a to FIG. 3c show diagrams of the shape of a signal of the angle sensor shown in FIGS. 1 and 2.
Figure 3B:
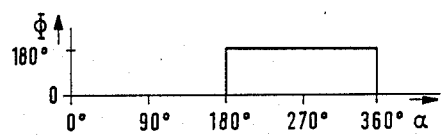
Figure 3C:
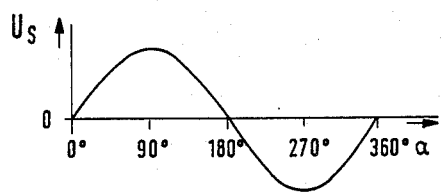

FIG. 3c shows the course of the output voltage of the coil 12 as a function of the angle $\alpha$. In FIG. 3b the phase $\Phi$ of the output voltage referred to the phase of the generator voltage feeding the coil 10 is shown as a function of the angle $\alpha$. FIG. 3a shows the course of the rectified signal voltage of the coil 12 as a function of the angle $\alpha$.

The second winding, which is 90° away, produces a cosine signal function (crossed coil). In addition to the sine-cosine system, a receiver coil with three windings arranged 120° apart as 3-phase system is also possible.

Any desired system transfers the signals to a receiver which derives the position angle of the rotor, via the unambiguous definitions of the signal functions, from the information. The feeding of the transmitter coil is effected without contact via the rotary transformer with the primary winding (16) and the secondary winding (15) which are so arranged concentrically that the energy transfer is independent of the angle $\alpha$.

Figure 4:
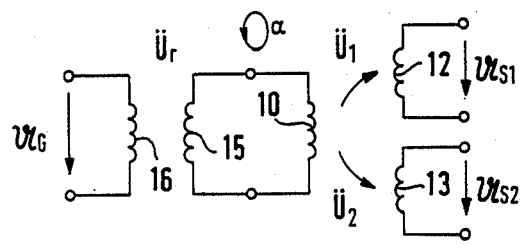
FIG. 4 is a diagram of the coils of an angle sensor.

An electric equivalent circuit diagram of a primary winding 16, a secondary winding 15 and the coils 10, 12, 13 is shown in FIG. 4 for a two-phase system. The complex signal voltage $U_{S1}$ of the coil 12 is proportional to a generator voltage $U_G$ and to the sine of the angle $\alpha$, and a complex signal voltage $U_{S2}$ is proportional also to $U_G$ and to the cosine of the angle $\alpha$.

There apply the relationships: $U_{S1} = a \times U_G \times \sin \alpha$, and $U_{S2} = a \times U_G \times \cos \alpha$, in which a is the total transmission from rotary transformer and stationary as well as turnable coils, and $U_G$ is the complex generator voltage.

Figure 5:
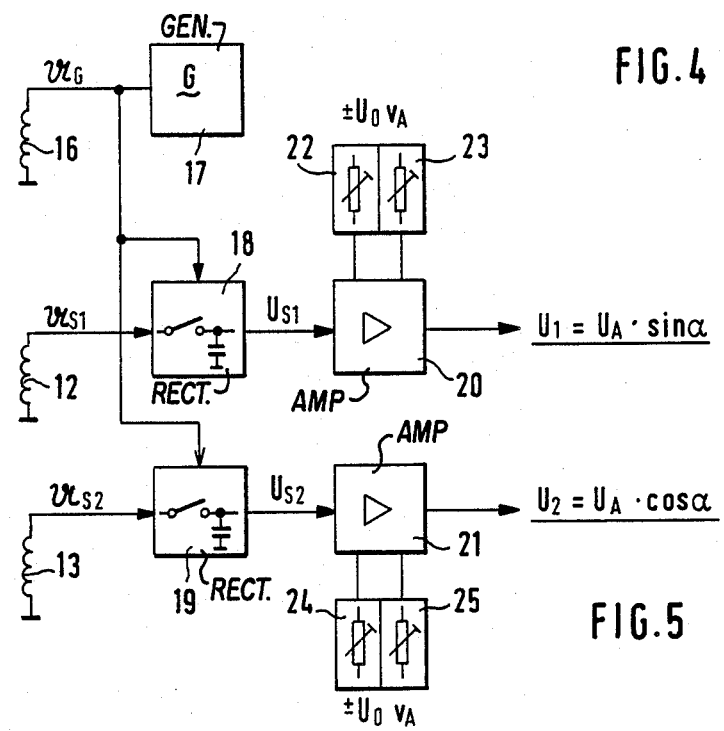
FIG. 5 is a block diagram of a device for signal rectification and for compensation for those deviations of the output signals of the stationary receiver part from a predeterminable function which are caused by asymmetries and inaccuracies in the arrangement of the transmitter parts.

Due to the mechanical tolerances present in the centering position of the coils 10, 12 and 13 of the cores 11 and 14 and the influence of the rotary transformer, the output voltages actually occurring at the coils 12 and 13 differ from the shape shown in FIG. 3c since these influences produce measurement errors with respect to the definition of the angle $\alpha$. The error voltages based on asymmetries can be compensated for in an arrangement located behind the outputs of the coils 12, 13. Such an arrangement is shown in FIG. 5.

A generator 17 produces a sinusoidal alternating voltage which feeds the primary winding 16. The coils 12 and 13 of the fixed transmitter part 9 are each connected to a phase-selective rectifier 18, 19. The rectifiers 18, 19 are actuated by a clock voltage which is derived from the alternating voltage of the generator 17. Amplifiers 20, 21 are connected behind the phase-selective rectifiers 18, 19, the amplifiers each having circuit components 22, 23 and 24, 25 to compensate for the deviations of the output signals of the coils 12, 13 from the shape shown in FIG. 3c which are caused by asymmetries in the mechanical arrangement of the coils 10, 12 13 and by inaccuracies. By the phase-selective rectification and the amplification, dc voltages are produced at the individual outputs of the amplifiers 20, 21 in accordance with the following relationships: $U_1 = U_A \times \sin \alpha$, $U_2 = U_A \times \cos \alpha$ in which $U_1$ and $U_2$ are the output dc voltages and $U_A$ the amplitudes. With the circuit components 22, 24 the measurement errors due to asymmetries are eliminated by simple superimposing of variable voltages $+U_0$.

If different amplitude values between $U_{S1}$ and $U_{S2}$ are present with the circuit components 23, 25, they can be counteracted by a variable amplification $V_A$ with the circuit components 23, 25. The compensated dc signals $U_1$ and $U_2$ are then available for the exact angle information.

Figure 6:
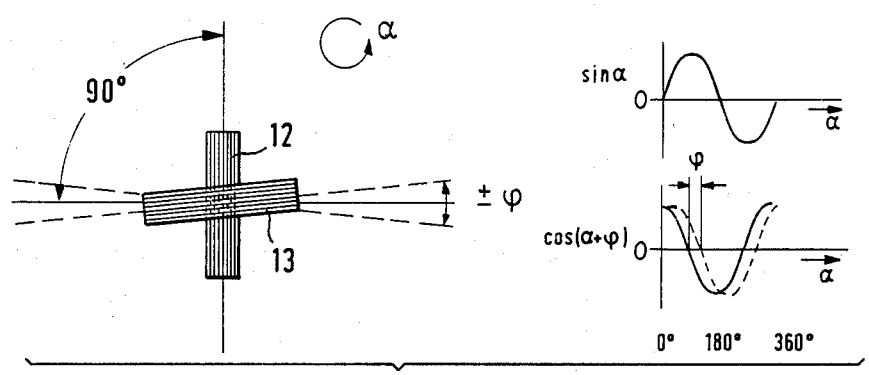
FIG. 6 shows two angularly shifted coils of the stationary receiver part.

The error influence of the angular shift which can be noted from FIG. 6. The angular shift $\tau$ of the coil 13 causes a phase error which produces the function $\cos(\alpha + \tau)$, i.e. the cosine function is shifted by the phase angle $\tau$. For the small angular shift $|\tau| < 5°$ in the normal case, the error is compensated for by the circuit arrangement shown in FIG. 7.

The output voltage $U'_1 = U_A \times \sin \alpha$ of the one channel, for instance of the sine channel, is fed inverted and non-inverted, to an adjustable voltage divider 26 the tap of which is located at one input of a summation amplifier 27 whose other input is acted on by the voltage $U'_2 = U_A \times \cos(\alpha \pm \tau)$. The voltage divider 26 produces an output voltage $\pm k \times U_1$ which causes an output voltage $U_2 \approx U_A \times \cos \alpha$ at the amplifier 27, in which connection we must have $k = \pm \tan \tau$.

For small angles $\tau$ there applies the approximation equation $$\alpha \approx \arctan\left(\frac{\sin\alpha}{\cos(\alpha \pm \tau) + k = \sin\alpha}\right)$$

(Equation 1)

Depending on the direction of the angle $\tau$, the action of the sine channel must also be correct in phase ($-U_1$, $+U_1$). For optimal compensation the coupling factor $k =$ the tangent of the angular shift $\tau$ must be set. As a result of the approximation formula (Equation 1), no complete compensation can be effected with this circuit. The residual error amounts, for instance, to at most 0.12° in the case of $\tau = 5°$ and 0.03° in the case of $\tau = 2.5°$. For $\tau < 2.5°$ the residual angle error is negligibly small.

Furthermore, the angular shift acts in the general angle-error equation $\Delta\alpha$ as follows:

$$\Delta\alpha \approx a \pm a \times \cos(2\alpha)$$

with $\alpha = \pm \tau/2$ and $\alpha = \mp \tau/2$.

In this way, the coefficient $a_4$ can also be manipulated via the coupling factor k.

By the reference alignment of the angle sensor 1 in given angular positions, the compensation coefficients can also be established.

Figure 8:
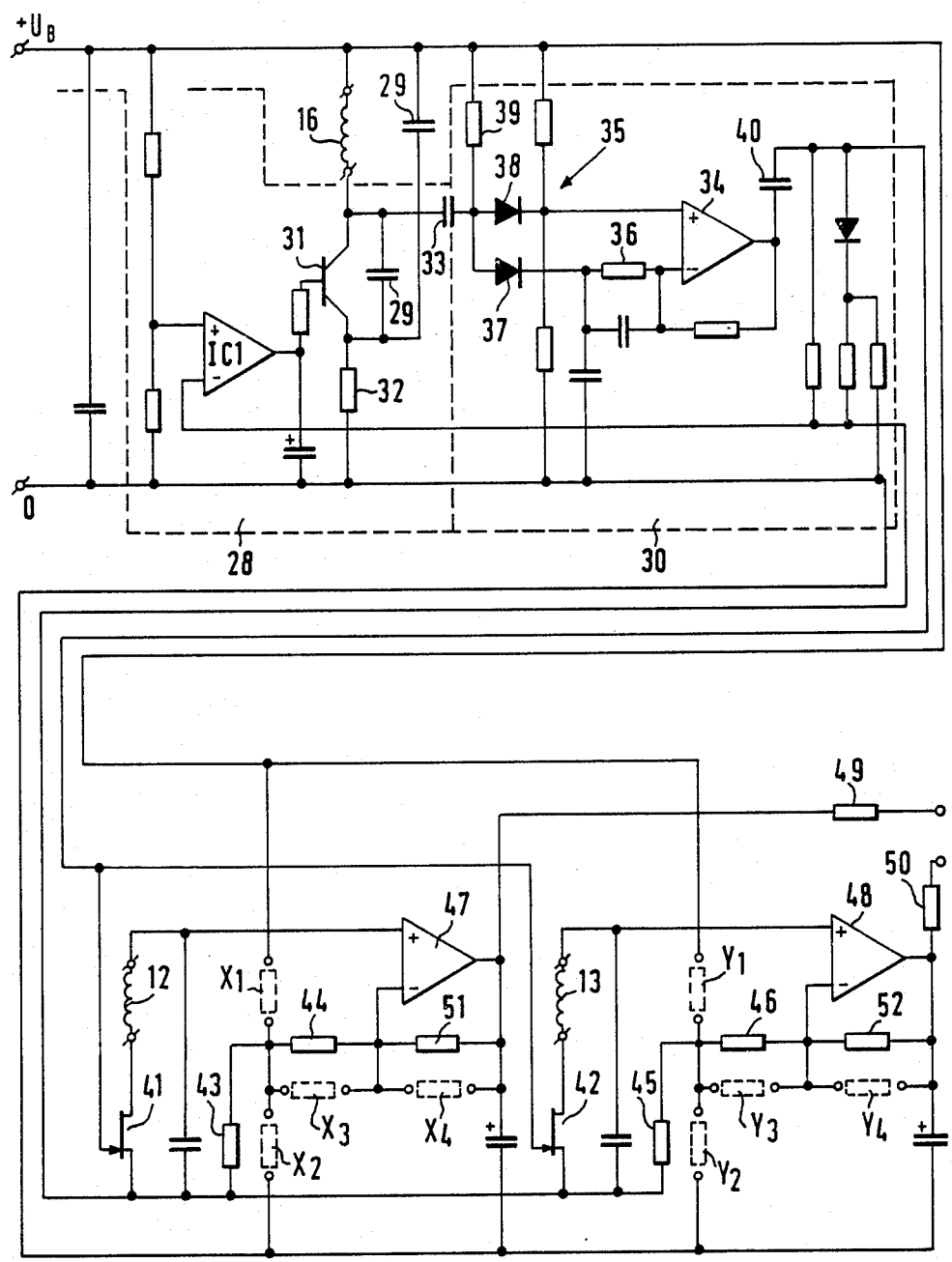
FIG. 8 is a circuit diagram of a signal processing, including generator and means for compensating for the deviations of the output signals of the fixed transmitter part from a predeterminable function which are caused by asymmetries and inaccuracies in the arrangement of the transmitter parts.

The circuit shown in FIG. 8 contains an oscillator 28 which, by means of two capacitors 29 in cooperation with the primary winding 16, produces an oscillation. The oscillator 28 is fed by an operating dc voltage between the poles of which the primary winding 16 is arranged in series with the collector-emitter path of a transistor 31 and a resistor 32. The capacitors 29 are connected in parallel to the series connection of the primary winding 16. The capacitive voltage divider tap is also coupled to the emitter of the transistor 31. A scanning signal generation 30 is connected to the collector of the transistor 31 via a coupling capacitor 33.

The phase-related scanning signal generation 30 contains an operational amplifier 34 the non-inverting input of which is connected to the tap of a voltage divider 35. The inverting input of the operational amplifier 34 is connected, via a resistor 36 and a diode 37, to the coupling capacitor 33, which is connected via another diode 38 also to the noninverting input of an operational amplifier 34. The anodes of the diodes 37, 38 are connected via a resistor 39 to the positive pole of the operating voltage.

The operational amplifier 34 which supplies the scanning pulses is connected, via a coupling capacitor 40, to the control electrodes of a first and a second FET switch 41, 42. The drain-source paths of the FET switches 41, 42 are in each case arranged in series with the coils 12, 13. There are resistors 43, 44, 51 and 45, 46, 52 respectively between the two inputs of operational amplifiers 47 and 48 respectively at the outputs of which the voltages $U_1$ and $U_2$ are available in each case over protective resistors 49, 50.

A voltage divider having two resistors X1 and X2 is, if necessary for the compensating of error voltages, connected by its tap to the resistor 44 to whch also, if necessary, a resistor X3 can be connected in parallel. A resistor X4 is, if necessary, connected in parallel also to the resistor 51. In corresponding manner, a voltage divider having the resistors Y1 and Y2 is connected, if necessary, by its tap to the resistor 46. The resistors Y3 and Y4 are connected in parallel to the resistors 46 and 52 if necessary. The values of the resistors X1 to X4 and Y1 to Y4 are adjusted corresponding to the asymmetries and inaccuracies to be corrected. In this connection the resistors X3 and X4 and Y3 and Y4 respectively are provided predominantly for adaption of the degree of amplification in order to produce output voltages $U_1$ and $U_2$ with equal amplitudes. By suitable selection of the values of the resistors X1, X2 and Y1, Y2 respectively, asymmetries can be compensated for.

Figure 7:
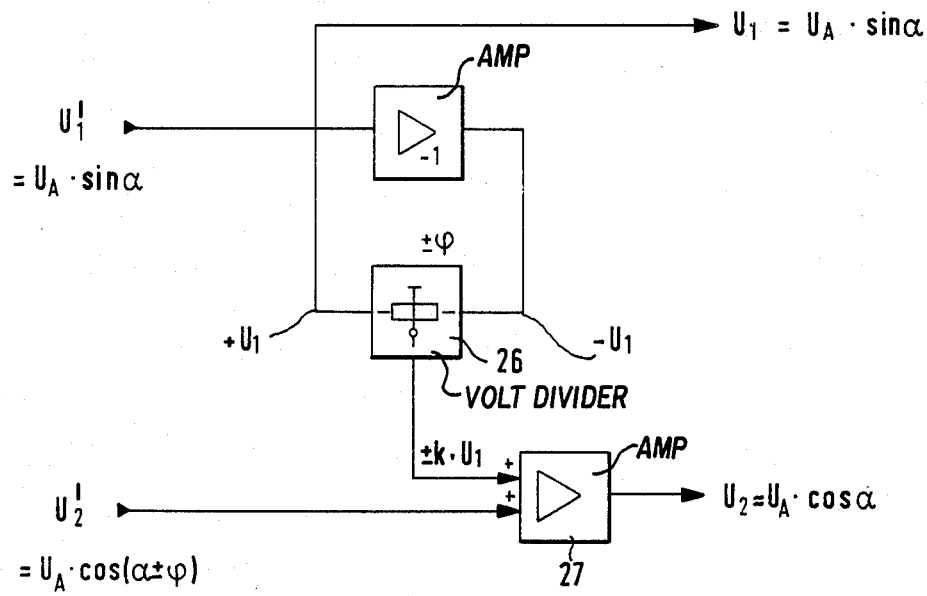
FIG. 7 is a circuit diagram of an arrangement for compensating for the error resulting from the angular shift.

The circuits shown in FIGS. 5, 7 and 8 are preferably arranged miniaturized in the housing 7. The rotary transformer and the coils 10, 12 and 13 are advisedly surrounded by a shielding against magnetic and electromagnetic fields so that external disturbances are excluded.

The angle transmitter described above can be used in the automobile industry, for instance for measuring the position of the gas pedal, the position of the throttle valve, the position of the steering wheel and a liquid level. Its use in the marine field is also possible. The angle transmitter can be used in wind measuring systems, for rudder position, for Z-gearing positions and for the determination of the length of anchor out. In aeronautics, use in general is possible for angle-position and revolution measurements. The same uses are possible in the industrial field.

I claim:

1. An angle sensor comprising
   a rotatable transmitter part;
   a stationary receiver part;
   a support holding said rotatable transmitter part facing said stationary receiver part; and wherein
   the rotatable transmitter part comprises a coil which is connectable to a source of alternating current, the coil being spirally wound on said rotatable transmitter part and extending on both sides of an axis of rotation, the rotatable transmitter part being rotatable about the axis of rotation, a longitudinal axis of said coil extending transverse to said axis of rotation;
   the stationary receiver part comprises a field sensor for electromagnetic fields, the field sensor being located opposite to and spaced from the coil and extending on both sides of the rotational axis transverse thereto; the angle sensor further comprising
   a rotary transformer having a primary winding and a secondary winding; and
   a housing enclosing said stationary receiver part and supporting said primary winding; and wherein
   said coil is connected to said secondary winding;
   said field sensor of said stationary receiver part includes two coils; said angle sensor further comprising
   a circuit connected to said two coils of said stationary part, said circuit including two FET switches, a set of resistors, and two operational amplifiers;
   an oscillator feeding the primary winding of the rotary transformer;
   a phase-related scanning signal generator connected to said primary winding, said phase-related scanning signal generator being controlled by the oscillator and being connected to one control electrode each of the FET switches; and wherein
   each said FET switch is connected, in series with a coil of the stationary receiver part and said set of resistors, to the inputs of the operational amplifiers, a variable gain and the superimposable voltage of the operational amplifiers serving for adjustment of compensation values to an angle measurement of the angle sensor; and
   an output of said field sensor is connected to said circuit, said circuit having circuit components for at least partially compensating for deviations, caused by asymmetries or inaccuracies in an arrangement of the transmitter and receiver parts, of an output signal of the stationary receiver part from a fixed relationship between the angular position of the rotatable transmitter part and an output signal of the stationary receiver part,
   said circuit components being components for compensating for asymmetries and/or signal amplitudes and/or coil-angle stagger.

2. An angle sensor according to claim 1, further comprising a housing of the transmitter parts, and wherein
   the circuit for compensating for the deviations, caused by asymmetries and inaccuracies in the arrangement of the transmitter and the receiver parts, in the output signal of the stationary receiver part is located at or near the transmitter part in said housing.

3. An angle sensor according to claim 2, further comprising a shielding against electromagnetic fields surrounding at least the transmitter and the receiver parts and the circuit.

4. An angle sensor comprising
a rotatable transmitter part;
a stationary receiver part;
a support holding said rotatable transmitter part facing said stationary receiver part; and wherein
the rotatable transmitter part comprises a coil which is connectable to a source of alternating current, the coil being spirally wound on said rotatable transmitter part and extending on both sides of an axis of rotation, the rotatable transmitter part being rotatable about the axis of rotation, a longitudinal axis of said coil extending transverse to said axis of rotation;
the stationary receiver part comprises a field sensor for electromagnetic fields, the field sensor being located opposite to and spaced from the coil and extending on both sides of the rotational axis transverse thereto; the angle sensor further comprising
a circuit; and wherein
an output of said field sensor is connected to said circuit, said circuit having circuit components for at least partially compensating for deviations, caused by asymmetries or inaccuracies in an arrangement of the transmitter and receiver parts, of an output signal of the stationary receiver part from a fixed relationship between the angular position of the rotatable receiver part and an output signal of the stationary receiver part,
said circuit components being components for compensating for asymmetries and/or signal amplitudes and/or coil-angle stagger; and
said field sensor of said stationary receiver part has two spirally wound coils which have their longitudinal axes 90° from each other, and which have outputs connected to said circuit.

5. An angle sensor according to claim 4, wherein
at least the coil of the rotatable transmitter part is wound on a ferromagnetic core, there being an external field encompassing both of said transmitter and said receiver parts within said external field.

6. An angle sensor according to claim 4, wherein
the core of the coil of the rotatable transmitter part is block-shaped, the angle sensor further comprising
a cylindrical disc core made of a highly permeable material, the coils of the stationary receiver part being arranged on said disc core.

7. An angle sensor according to claim 6, further comprising
a housing with a bore therein, and a rotatable shaft of nonmagnetic material; and wherein
said coil with the block-shaped core of the rotatable transmitter part is fastened in the end of said rotatable shaft; and
said coils wound on the disc core of the stationary receiver part are disposed at a bottom of the bore in said housing.

8. An angle sensor according to claim 4, wherein
said circuit provides that the angular shift between two coils of the stationary receiver part, is compensatable by superimposing, with correct sign, a value of one output voltage on the other output voltage of the two coils of the stationary part, said value being proportional to the tangent of the angle of shift.

9. An angle sensor according to claim 4, wherein said two coils of the stationary receiver part are developed for producing one period each of a sinusoidal and cosinusoidal amplitude of the output voltage as a function of the position of rotation of the rotatable transmitter part upon a full revolution.

10. An angle sensor comprising
a rotatable transmitter part;
a stationary receiver part;
a support holding said rotatable transmitter part facing said stationary receiver part; and wherein
the rotatable transmitter part comprises a coil which is connectable to a source of alternating current, the coil being spirally wound on said rotatable transmitter part and extending on both sides of an axis of rotation, the rotatable transmitter part being rotatable about the axis of rotation, a longitudinal axis of said coil extending transverse to said axis of rotation;
the stationary receiver part comprises a field sensor for electromagnetic fields, the field sensor being located opposite to and spaced from the coil and extending on both sides of the rotational axis transverse thereto; said field sensor further comprising
two coils within the stationary receiver part which are developed for producing one period each of a triangular-shaped voltage per revlution of the rotatable transmitter part, the two voltages being shifted in phase by a quarter period with respect to each other.

11. An angle sensor according to claim 10, further comprising
amplifiers having the circuit components capable of changing compensation values,
a phase-selective rectifier controlled by the source of alternating current; and wherein
the output voltages of the two coils of the stationary receiver part connected to said amplifiers via said phase-selective rectifier.

12. An angle sensor comprising
a rotatable transmitter part;
a stationary receiver part;
a support holding said rotatable transmitter part facing said stationary receiver part; and wherein
the rotatable transmitter part comprises a coil which is connectable to a source of alternating current, the coil being spirally wound on said rotatable transmitter part and extending on both sides of an axis of rotation, the rotatable transmitter part being rotatable about the axis of rotation, a longitudinal axis of said coil extending transverse to said axis of rotation;
the stationary receiver part comprises a field sensor for electromagnetic fields, the field sensor being located opposite to and spaced from the coil and extending on both sides of the rotational axis transverse thereto; said angle sensor further comprising
a rotary transformer having a primary winding and a secondary winding; and
a housing enclosing said stationary receiver part and supporting said primary winding; and wherein
said coil is connected to said secondary winding;
said stationary receiver part includes two coils; said angle sensor further comprising
a circuit connected to said two coils of said stationary part, said circuit including two FET switches, a set of resistors, and two operational amplifiers;
an oscillator feeding the primary winding of the rotary transformer;

a phase-related scanning signal generator connected to said primary winding, said phase-related scanning signal generator being controlled by the oscillator and being connected to one control electrode each of the FET switches; and wherein each said FET switch is connected, in series with a coil of the stationary receiver part and said set of resistors, to the inputs of the operational amplifiers, a variable gain and the superimposable voltage of the operational amplifiers serving for adjustment of compensation values to an angle measurement of the angle sensor.

13. An angle sensor according to claim 12, further comprising flexible lines for connecting said coil of the rotatable transmitter part to an alternating current source.

* * * * *